(12) United States Patent
Lee et al.

(10) Patent No.: US 7,222,162 B2
(45) Date of Patent: May 22, 2007

(54) CONTENTS DOWNLOADING SYSTEM AND METHOD THEREOF

(75) Inventors: Ju-yup Lee, Suwon (KR); Jong-phil Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 658 days.

(21) Appl. No.: 10/193,211

(22) Filed: Jul. 12, 2002

(65) Prior Publication Data

US 2003/0018751 A1    Jan. 23, 2003

(30) Foreign Application Priority Data

Jul. 13, 2001    (KR) .......................... 2001-0042489

(51) Int. Cl.
*G06F 15/16* (2006.01)
*G06F 15/177* (2006.01)

(52) U.S. Cl. ..................... 709/217; 709/219; 709/229

(58) Field of Classification Search ............... 709/219, 709/220, 217, 229

See application file for complete search history.

(56) References Cited

U.S. PATENT DOCUMENTS

| | | | |
|---|---|---|---|
| 5,790,423 A * | 8/1998 | Lau et al. ..................... 700/94 |
| 5,926,624 A * | 7/1999 | Katz et al. ................... 709/217 |
| 6,205,101 B1 * | 3/2001 | Furuhashi ................. 369/53.29 |
| 6,711,464 B1 * | 3/2004 | Yap et al. .................... 700/233 |
| 2001/0039659 A1 * | 11/2001 | Simmons et al. ............. 725/61 |
| 2002/0124093 A1 * | 9/2002 | Nakai .......................... 709/229 |
| 2003/0069904 A1 * | 4/2003 | Hsu et al. ................... 707/204 |

FOREIGN PATENT DOCUMENTS

WO    WO0138993 A1 *    5/2001
WO    WO 200138993 A1 *    5/2001

* cited by examiner

*Primary Examiner*—Rupal Dharia
*Assistant Examiner*—Brian J. Gillis
(74) *Attorney, Agent, or Firm*—Staas & Halsey LLP

(57) ABSTRACT

A contents downloading system and a method thereof. According to the system, when a media device is connected to a detachable user terminal device, a device identifier is transmitted to the user terminal device from the media device. The user terminal device then transmits the device identifier to a server device that provides contents corresponding to the device identifier, and the server device transmits the contents selected based on the device identifier and an environment to download configured by a user. Since the media device is automatically connected to a specific website providing every kind of contents necessary for each media device based on the device identifier of the media device, the user can download the contents more conveniently without driving a web browser or selecting contents to be downloaded.

22 Claims, 5 Drawing Sheets

CONTENTS DOWNLOADING SYSTEM AND METHOD THEREOF

CROSS-REFERENCE TO RELATED APPLICATIONS

This application claims the benefit of Korean Application No. 2001-42489, filed Jul. 13, 2001, in the Korean Industrial Property Office, the disclosure of which is incorporated herein by reference.

BACKGROUND OF THE INVENTION

1. Field of the Invention

The present invention relates to a contents downloading system and a method thereof, and more particularly, to a contents downloading system and a method of downloading the contents a user wants to a detachable media device through a communication network.

2. Description of the Related Art

As the Internet has spread broadly, more people are obtaining information through the Internet. For example, the Internet now provides a variety of contents like MP3 music files or Ebooks, etc. Following the trend, the demand for a player reproducing a specific type of contents, e.g., a digital convergence disk player, MP3 player, etc., has been continuously growing.

Figure 1:
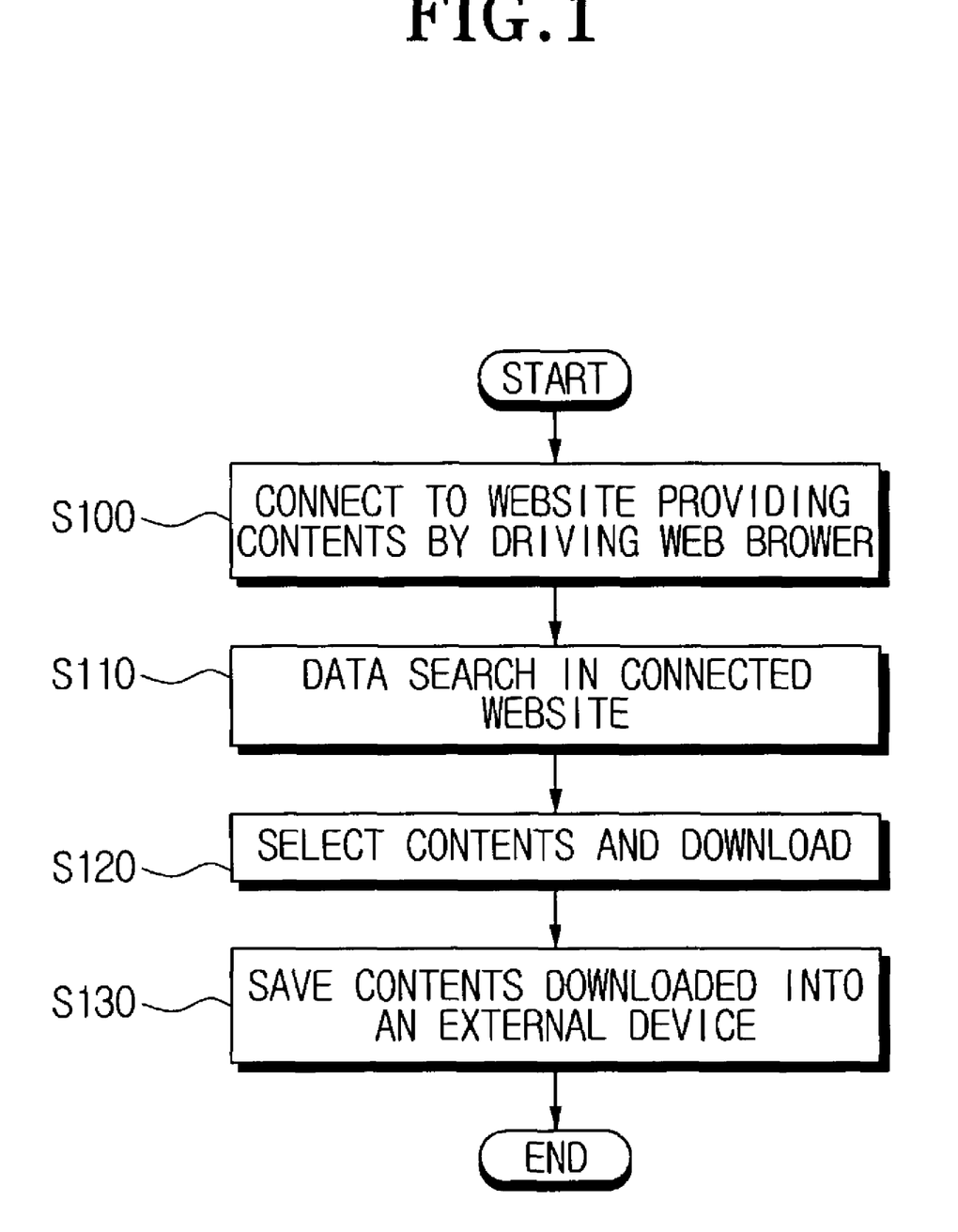
FIG. 1 is a flow chart illustrating a contents downloading method through the Internet according to a conventional method.

FIG. 1 is a flowchart of a conventional procedure for downloading contents through the Internet.

According to FIG. 1, if a user wants to download any contents through the Internet, the user should run a web browser (for example, Explorer, Netscape, or Soribada, etc.) first and access a website that provides the corresponding contents (S100). After connecting to the website, the user searches and tries to find the contents the user desires to download (S110). When the user finds the contents after accessing the website, the user downloads the contents to a computer (S120), which the user owns. When all the above operations are completed, the contents are stored in the computer of the user, thereby the user saves the contents into an external device (S130).

However, such a method, as above-described, is generally uncomfortable and complicated because the user must drive the web browser each time he downloads some contents. Further, whether or not the user knows exactly where the contents are in the website does not matter because the user must complete the above operations regardless of whether the user knows a location of the content. In particular, when the user frequently visits a specific website (for example, a site that provides a song of a singer which the user favors), the user still has to complete a registration form and input the same information repeatedly using either a mouse or a keyboard.

Besides, if the user wishes to download the contents to a device with a unique identifier like a DCDP (Digital Convergence Disk Player), the user must connect to the web site that provides the contents necessary for the DCDP and download the desired contents to the computer of the user, and then save the contents into an external device again.

SUMMARY OF THE INVENTION

Accordingly, a contents downloading system and method thereof is provided, in which a user can directly access desired content to download, without a requirement to go through a series of procedures, such as an operation of a web browser or searching the content of a web site.

Additional objects and advantages of the invention will be set forth in part in the description which follows and, in part, will be obvious from the description, or may be learned by practice of the invention.

To achieve the above and other objects, a contents downloading system, includes: a server device providing contents; a media device playing/recording the contents or receiving and transmitting data; and a user terminal device connected to the media device and transmitting a device identifier received from the media device to the server device to download a content corresponding to the device identifier of the media device from the server device, and transmitting the content to the media device.

The server device may include: a database unit saving the content; an authentication unit performing an authentication operation on the device identifier that has been transmitted; a storage unit saving an environment to download for the device identifier; and an operation unit searching the content corresponding to the device identifier from the database, and transmitting the content to the user terminal device if the device identifier transmitted from the authentication unit has been authenticated.

The server device may further include a counting unit managing a possible download frequency of the identical content downloaded to the media device corresponding to the device identifier. When the user downloads identical content within the possible download frequency limit designated by the device identifier, an operation unit of the server device deducts the possible download frequency limit, and if a request to download the identical content exceeds the possible download frequency from the media device corresponding to the device identifier, the server device does not allow the downloading.

The user terminal device may include a telecommunication unit transmitting and receiving data with the server device; a connection unit connected to the media device receiving the device identifier from the media device; and a control unit transmitting the device identifier received from the connection unit to the server device through the telecommunication unit. Thus, a user can automatically connect to the web site corresponding to the device identifier by using the device identifier received from the media device.

The user terminal device may further include a detection unit detecting the connection status of the media device. The content downloading device, therefore, can more actively detect the connection status of the media device.

Further, the user terminal device is provided with a user interface for inputting an environment to download from the user, and outputs at least part of the content downloaded from the server device. A control unit then transmits the environment to download that has been inputted by the user to the server device through the telecommunication unit. Accordingly, by transmitting the environment to download that has been inputted by the user through the input unit to the server device, and then the user can download a particular content the user desires at any time.

Moreover, the control unit transmits the content selected by the user among other contents downloaded to the media device through the connection unit. Hence, the user is able to survey the downloaded content that is outputted through the user interface, and the user can save desired contents into a storage device in the media device.

The media device comprises: an engine unit performing recordation of data in a disk, reading out the data from the disk, and transmitting the device identifier recorded therein; and a host controlling the engine unit, transmitting the device identifier to the server device through the user terminal device by connecting to the user terminal device, and receiving the content.

The engine unit may comprise: a DCD deck unit, to which the disk is inserted, recording data in the disk and/or reading out the data from the disk; a DCD servo driving the DCD deck unit; a buffer temporarily saving the data to be recorded and played in case the data is recorded in the disk and played later; an engine memory saving code values of commands that are shared with the disk and/or the host, data to control the engine unit, and a device identifier; an engine control unit controlling the DCD deck unit when the disk is inserted, and outputting a control command to transmit the device identifier to the user terminal device when the media device is connected to the user terminal device; and an engine interface transmitting and receiving the control command and data with the host.

The host may comprise: a digital signal process unit, connected to the engine interface, controlling a record/read out operation of data by accessing the engine unit, controlling a play operation of the read out data, controlling transmission operation of the device identifier, and control the media device for a proper process of play/record of a file according to characteristics of the data; a memory saving record time data and directory data of a file that are received from the disk; an interface unit transmitting and receiving the data from the user terminal device; and an audio output unit outputting an audio data played from the disk, and outputting messages generated by the digital signal process unit.

The contents downloading method includes: receiving a device identifier from a detachable/attachable media device; transmitting the device identifier to a server device that provides contents; and receiving the selected content based on the device identifier from the server device. Since the system of an embodiment of the present invention enables a user to connect to a specific web site according to the device identifier that is transmitted from the media device, the user does not have to complete a series of operations to download the desired content.

Following receiving a device identifier operation, a web browser corresponding to the device identifier is operated, and connected to the server device. Since the web browser is operated according to the device identifier received, the user does not have to carry out extra operations to drive the web browser.

One operation can be provided prior to the receiving a device identifier operation by transmitting the environment to download from the user to the server device that provides contents. By the user setting up the environment to download desired contents by connecting to the server device that provides the contents before connecting to the media device, the user can download of the desired contents more precisely. Further, the connection status of the media device can be detected prior to receiving a device identifier operation by actively checking a connection state.

The contents the user selected are then transmitted to the media device. After that, among other downloaded contents, the content the user desired to save into the media device is properly saved in the storage device equipped in the media device.

The receiving the selected contents based on the device identifier from the server device may further comprise: setting a limit on a possible download frequency against further downloads of the identical contents with a designated device identifier. Accordingly, the system of the present invention, while checking the device identifier of each media device, can count the download frequency of the identical contents so that the identical contents can be prevented from being downloaded too often.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
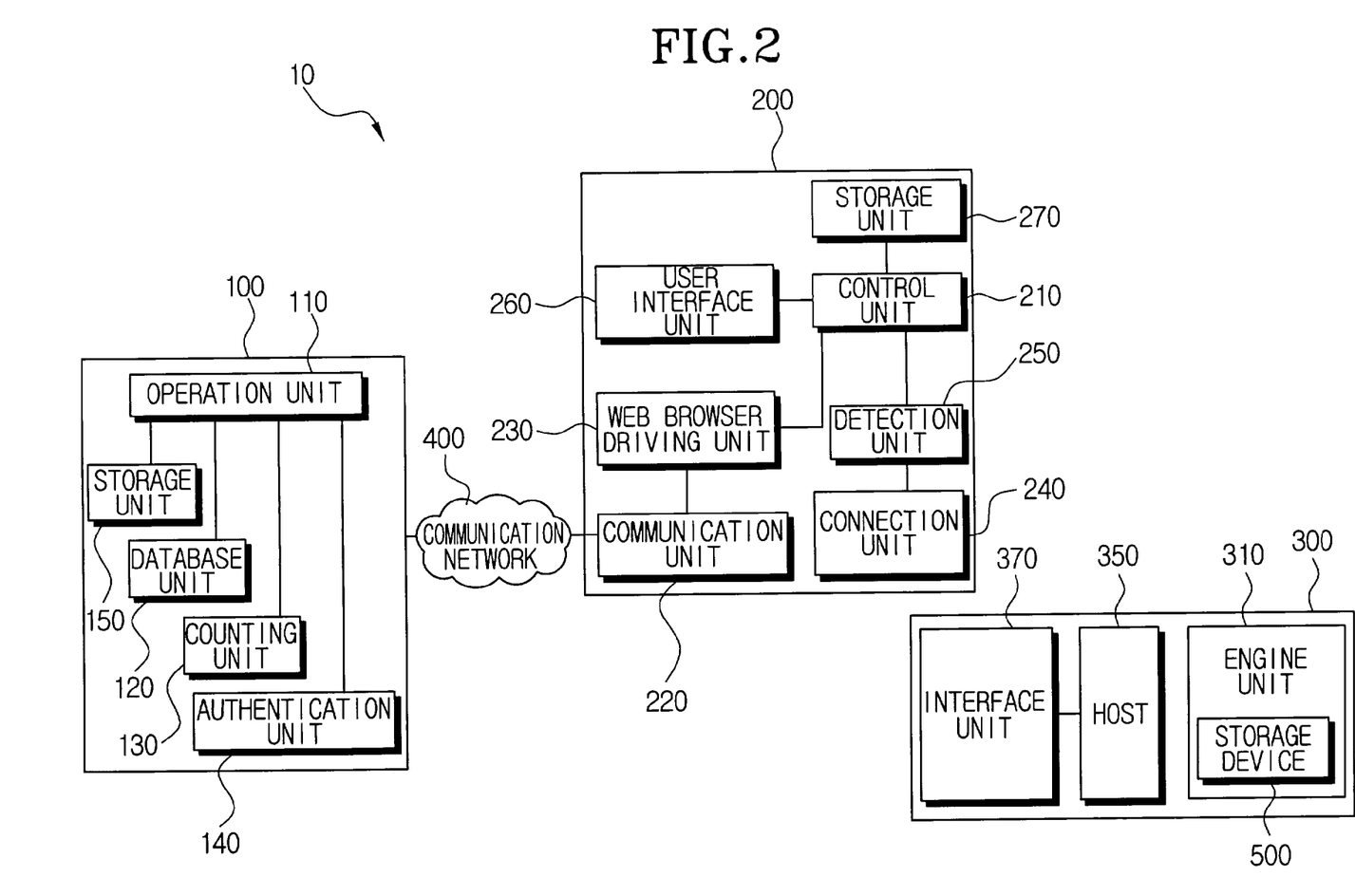
FIG. 2 is a block diagram illustrating a contents downloading system according to an embodiment of the present invention.

FIG. 2 is a block diagram illustrating a contents downloading system in accordance with an embodiment of the present invention.

Referring to FIG. 2, the contents downloading system 10 includes a server device 100, a user terminal device 200 and a media device 300. The server device 100 and the user terminal device 200 are connected to each other via a communication network 400.

The server device 100 includes a database unit 120 storing the contents, an authentication unit 140 authenticating a device identifier received, a storage unit 150 storing data on a registration status of the device identifier, a possible download frequency corresponding to the device identifier and/or an environment to download, and an operation unit 110 transmitting contents, which correspond to the device identifier as a result of searching the contents in the database unit 120, to the user terminal device 200, when the authentication unit 140 authenticates the device identifier.

Upon a receipt of a device identifier of the media device 300 from the user terminal device 200 through the communication network 400, the operation unit 110 outputs a control signal to the authentication unit 140 to conduct an authentication operation upon the device identifier transmitted. According to the control signal inputted by the operation unit 110, the authentication unit 140 authenticates the corresponding device identifier if a record exists that the subject device identifier has been properly registered. The operation unit 110 then searches the environment to download that is stored in the storage unit 150, and transmits the contents corresponding to the device identifier to the user terminal device 200 according to the authentication result.

The server device 100 may further include a counting unit 130 managing a download frequency of the identical contents on the media device 300 corresponding to the device identifier that is transmitted. In such a case, the possible download frequency designated to the media device 300, which is represented by device identifier, may be stored into the storage unit 150.

The operation unit 110 receives the device identifier from the user terminal device 200, and when a request for a download of specific contents occurs, the operation unit 110 requests the download frequency for a transmission of the identical contents corresponding to the device identifier up to the present from the counting unit 130. Meanwhile, the counting unit 130 includes information on the number of times a transmission of the identical contents corresponding to the device identifier occurs, and the counting unit 130 outputs the frequency to the operation unit 110, as requested. Further, if the user terminal device 200, corresponding to the same device identifier, repeatedly requests to download the contents that has already been downloaded, the counting unit 130 counts the download frequency of the contents.

For example, if a possible download frequency of the identical contents is set at 3, and the media device 300 already received the 3 downloads corresponding to the identical contents, the counting unit 130 notifies the operation unit 110 that no more downloading of the corresponding identical contents is possible. The operation unit 110 then transmits a message such as "Exceeded the maximum download frequency" to the user terminal device 200, thereby informing the user that the user cannot download the contents any more. Further, when the operation unit 110 repeatedly receives a request for the download of the identical contents from the user, the operation unit 110 transmits the remaining possible download frequency to the user terminal device 200.

Figure 5:
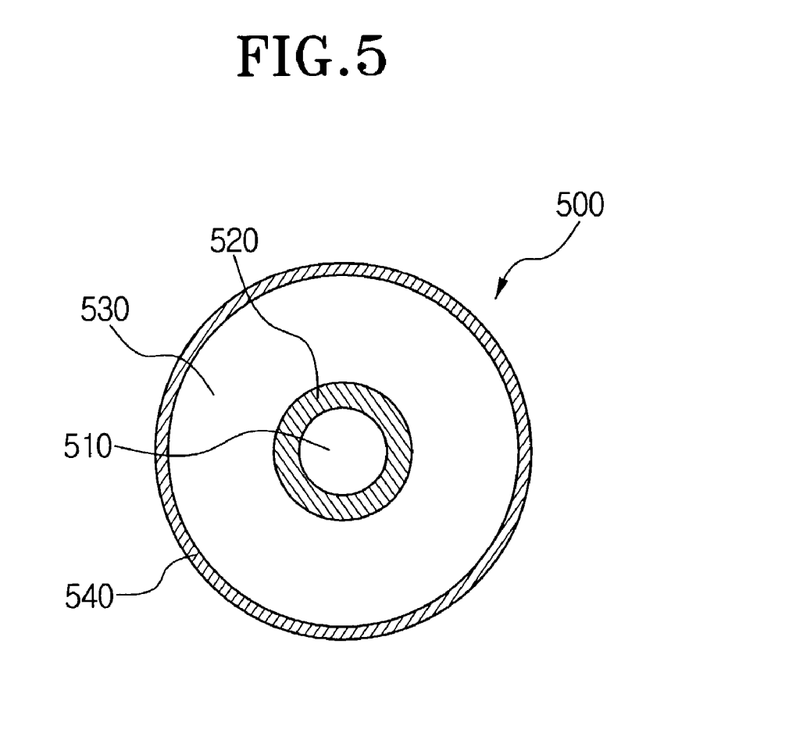
FIG. 5 is a plane view showing one side of the DCD according to a recording part.

In the contents downloading system, the user terminal device 200 can be used as a communicable computer, a PDA, or even a cellular phone. The contents downloading system includes a control unit 210, a communication unit 220, a web browser driving unit 230, a connection unit 240, a detection unit 250, a user interface unit 260, and a storage unit 270. The user terminal device 200, when used as the computer by the user, will be now explained. Further, the media device 300 can be used as a DCDP (Digital Convergence Disk Player), or an MP3. The following illustrates the case that the media device 300 is used as the DCDP. In such case, the storage device 500, as shown in FIG. 5, installed in the media device 300 is a DCD.

The communication unit 220 is connected to the communication network 400, such as the Internet, and transmits data to and receives data from the server device 100. The server device 100 connected to the communication unit 220 may be a web server, but may further provide optional information like an FTP server.

A web browser driving unit 230 drives a web browser, for example, Explorer, Netscape, etc., and connects to the server device 100 corresponding to the device identifier of an individual DCDP media device 300. Each device identifier of the DCDP media device 300 is stored in the storage unit 270 of the personal computer 200, and the IP address of a corresponding server device to each device identifier is linked in the form of bookmarks. When the control unit 210 receives the device identifier from the DCDP media device 300, the control unit 210 outputs a command signal commanding the web browser driving unit 230 to drive the web browser. The web browser driving unit 230 then drives according to a control signal that is inputted, and connects to the server device 100 having the corresponding device identifier to the device identifier received.

The connection unit 240 is one of configuration elements, the connection unit 240 being connected to the detachable DCDP media device 300. The connection unit 240 can be either a parallel port or a serial port, for example, a universal serial bus (USB). The connection unit 240 transmits/receives data between the user terminal 200 and DCDP media device 300. Further, the connection unit 240 can include a bluetooth chip that transmits/receives data via wireless communications between the personal computer 200 and the DCDP media device 300.

The detection unit 250 detects the connection status of the DCDP media device 300. The detection unit 250 can be used as a voltage sensor, as a connector (not shown) of the DCDP media device 300, which is connected to the connection unit 240, or as a separate stand-alone sensor. The detection unit may be incorporated into the software, as well.

When the connection unit 240 includes the bluetooth chip, the detection unit 250 can be configured on the bluetooth chip. In such a case, the detection unit 250 allows the personal computer 200 to make address inquiries and call actions to set up a wireless communication environment, and also allows the DCDP media device 300 to respond to inquiries about addresses and calls.

The user interface unit 260 outputs at least parts of the contents downloaded from the server device 100, and to which, the environment to select or download the contents to be saved into the DCDP media device 300 is inputted by the user. The user may search a list of the downloaded contents or read the downloaded contents through the user interface unit 260, may select the contents desired to be saved into the DCDP media device 300 among the downloaded contents, or may input the environment to transmit to the server device 100.

The control unit 210 controls operations of each of the configuration elements, and upon the receipt of the device identifier of the DCDP media device 300 through the connection unit 240, the control unit transmits the device identifier to the server device 100 through the communication unit 220. Further, the control unit 210 outputs a control signal to the storage unit 270 to store the contents that are transmitted from the server device 100 through the communication unit 220, or transmits the contents to the DCDP media device 300. The storage unit 270 can be used as a self-equipped storage medium, such as a hard disk, or a separate storage medium such as a floppy disk.

Figure 3:
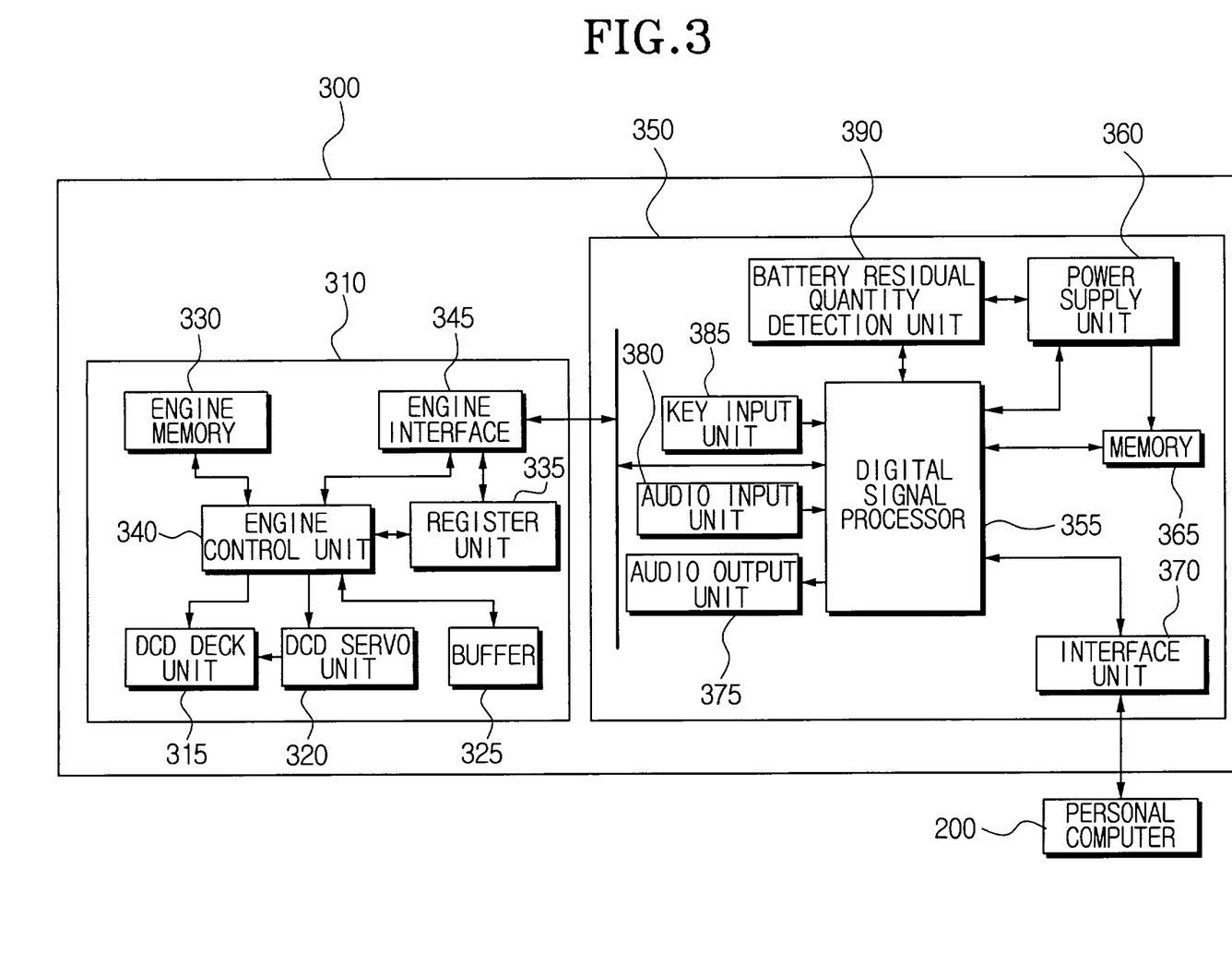
FIG. 3 is a block diagram illustrating a schematic configuration of a digital convergence disk player (DCDP) recording data in a digital convergence disk (DCD) or playing data that are recorded in the DCD.

FIG. 3 is a block diagram illustration a schematic configuration of the DCDP media device 300 recording data in the DCD or playing data that are recorded in the DCD.

With reference to FIG. 3, the DCDP media device 300 includes an engine unit 310 and a host 350.

The engine unit 310 is a DCD driver recording and reading out data on a DCD 500. The host 350 is connected to the engine unit 310, and controls the engine unit 310. The host 350 can be connected to the personal computer 200 and thereby control the engine unit 310.

The engine unit 310 includes a DCD deck unit 315, a DCD servo 320, a buffer 325, an engine memory 330, an engine control unit 340, and an engine interface 345. When the DCD is inserted to the engine unit 310, the DCD deck unit is controlled by the engine control unit 340 and the DCD deck unit records and plays the data on the DCD 500. The engine control unit 340 transmits and receives data with a digital signal processor (DSP) 355 of the host 350 through the engine interface unit 345. The DCD servo unit 320 drives the DCD deck unit 315 under the control of the engine control unit 340. Under the control of the engine control unit 340, the DCD deck unit 315 reads out the data from the DCD 500.

The buffer 325, when the data on the DCD 500 are recorded and played, stores the data temporarily, and the buffer 325 can be an SRAM (Static Random Access Memory). The engine memory 330 stores all commands that are shared with the DCD 500, the engine unit 310 and the host 350, and stores data for control, and uses flash memory (flash RAM). The engine control unit 340 controls the DCD deck unit 315, the DCD servo 320 and the buffer 325. The engine interface 345 provides an interface between the engine unit 310 and the host 350.

The host 350 includes the DSP 355, a power supply unit 360, a memory 365, an interface 370, an audio output unit 375, an audio input unit 380, a key input unit 385, and a battery residual quantity detection unit 390.

The DSP 355 connects to the engine interface 345 and accesses the engine unit 310 to record and read out the data, and controls the operation of playing the data read and controls the DCDP media device 300. Moreover, the DSP 355 controls the DCDP 300 making the process of data files to be properly played/recorded in accordance with the characteristic of the data that are read out in a file unit.

The power supply unit 360 includes a main battery (not shown), and a backup battery (not shown). The main battery supplies power driving the DCDP media device 300. The backup battery supplies power restoring the data remaining in the memory 365 to the DCD 500 after power to the DCDP media device 300 is turned off. The battery residual quantity detection unit 390 detects the remaining charge of the main battery and sends a result to the DSP 355.

The memory 365, under the control of the DSP 355, receives recording time information data and directory information of recorded files from the DCD, and stores the recording time information data and the directory information of the recorded files.

The interface unit 370 is the interface between the DCDP media device 300 and the personal computer 200. Including the universal serial bus (USB), the interface can be a parallel port or a serial port. The interface unit 370 can be a wireless interface device such as the bluetooth chip. The interface unit 370 transmits the data between the DCDP media device 300 and the personal computer 200.

The audio output unit 375 outputs the audio data reproduced from the DCD 500, and every kind of message that is generated from DSP 355. The audio input unit 380 processes a voice command inputted from the user and transmits the processed command to the DSP 355. The user can input the command through a key input unit 385 to the DCDP media device 300 as well.

Figure 4:
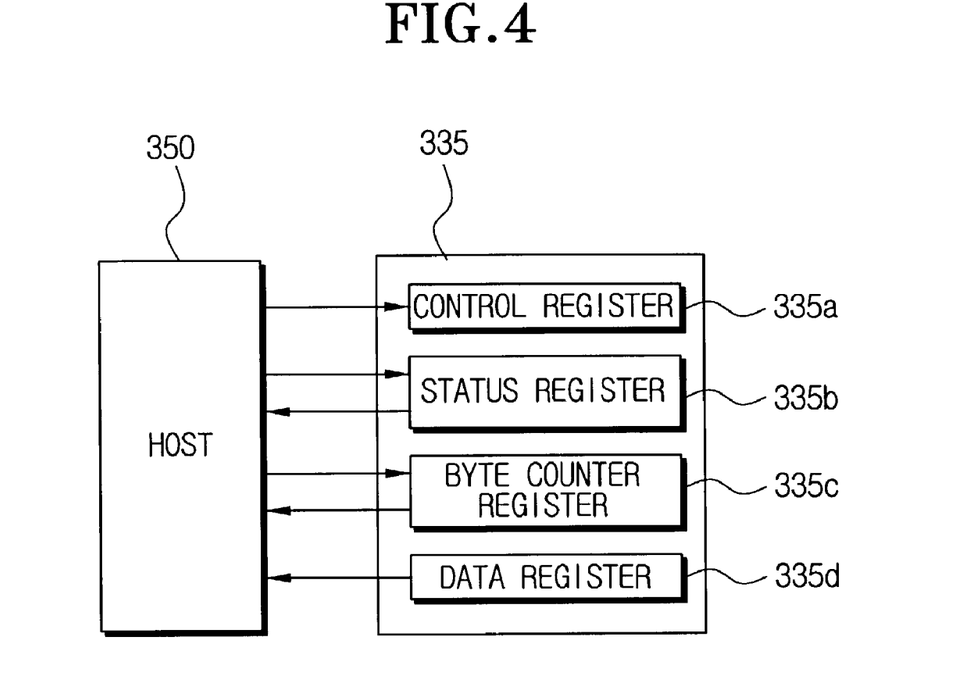
FIG. 4 is a block diagram illustrating an internal configuration of a register unit in an engine unit of the DCDP.

The engine unit 310 includes a register unit 335 with four registers. FIG. 4 is a block diagram illustrating an internal configuration of the register unit 355 equipped in the engine unit 310 of the DCDP media device 300. With reference to FIG. 4, the register unit 335 includes a control register 335a, a status register 335b, a byte counter register 335c, and a data register 335d. Each register 335a–335d is used for the communication with the host 350. The host 350 selects one register in the register unit 335 to access in accordance with an address bit being 2 bits (DPI_ADD0 and DPI_ADD1). The host 350 performs the recording operation on the control register 335a, and the engine unit 310 performs the readout operation.

The control register 335a has a function control and interface interrupt enable/disable values that are recorded by the host 350. The host 350 performs only the readout operation, and the engine unit 310 performs the recording and the readout operations on the status register 335b. The status register 335b possesses the status data and the cause of interrupt data. Meanwhile, the host 350 and the engine unit 310, respectively, performs both recording and readout operations on the byte counter register 335c, with the exception that the host 350 can only perform the recording operation on the byte counter register 335c when a busy bit of the status register 335b is clear, and if the data bit of the status register 335b is set, the host 350 reads out return valid information from the byte counter register 335c.

The byte counter register 335c includes a byte counter for transmission of a next command, data or a status phase. The host 350 and the engine unit 310 perform both recording and readout operations on the data register 335d, with the exception that the host 350 records the data in the data register 335d to transmit the data to the engine unit 310 during a command phase and a data read out phase, while the host 350 reads out the data register 335d to transmit the data from the engine unit 310 during a status phase and a data read in phase.

There exist four layers between the host 350 and the engine unit 310, for example, a physical layer which connects the host 350 and the engine unit 310 physically, a data link layer which defines a usage method of data exchange, a command layer which records commands relative to the data on the DCD 500 to control the data accessed by the engine unit 310, and an application layer which includes a file data/meta data mapping and a user interface. By providing a connection status of the four layers between the host 350 and the engine unit 310, the file data/meta data recorded in the DCD 500 operated by the engine unit 310 can improve transmission to the host 350 to be processed.

FIG. 5 is a plane view showing one side of the DCD 500 according to a recording part.

Referring to FIG. 5, the DCD 500 has a circular plate shape, and from the center of the plate to the outward direction, the DCD 500 is divided into a hole part 510, a unique number recording part 520, a data recording part 530, and a file system recording part 540.

The hole part 510 is formed in the center of the DCD 500, and the hole part 510 keeps the DCD 500 from severely shaking while in rotation. The unique number recording part 520 of the DCD 500 surrounds a certain designated range of the hole part 510, thereby providing a ring-like shape. Each unique number given to every DCD 500 is recorded in the unique number recording part 520 to distinguish each of the DCDs 500 from one another. Further, the unique number recording part 520 includes information distinguishing one side of the DCD 500 from the other side, which is possible because of the property of the DCD 500, a double-side recordable PhotoRecord medium. The data recording part 530 can include, for example, music data, document data and picture data, and occupies most of the DCD capacity.

The file system recording part 540 surrounds an outer part of the DCD 500 thereby producing a ring-like shape. The file system recording part 540 includes data on every file recorded in the data recording part 530 including file system data and directory data. The file system data indicates a file size of the file recorded in the data recording part 530 of the DCD 500, a file name, a recording date and a recording time, a file format, directory data on the recorded data and a final correction date and a final correction, time, etc. The directory data indicates a space to save relevant files in a group.

Irrelevant files are saved in another directory so that the relevant and irrelevant files do not co-mingle with each other.

Figure 6:
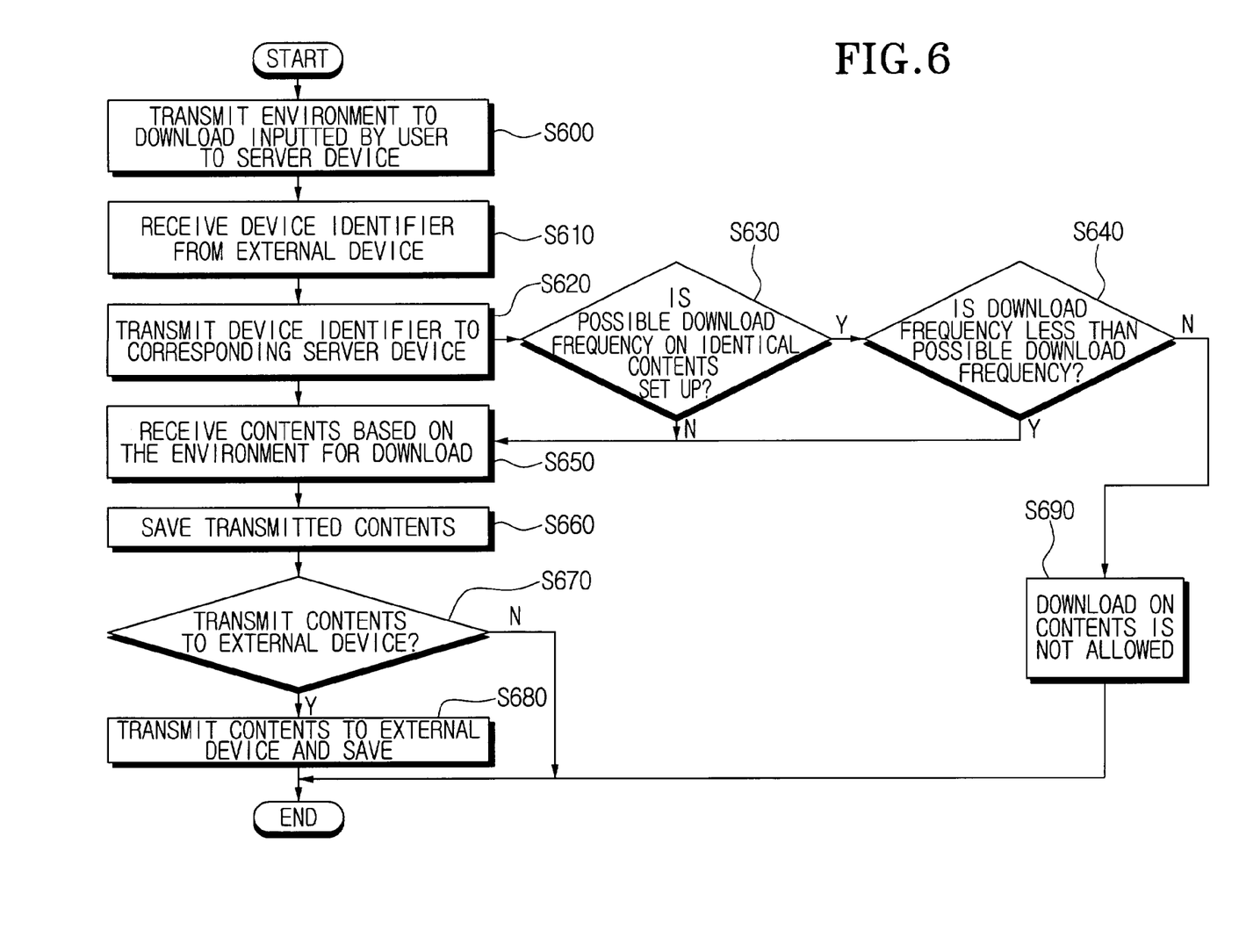
FIG. 6 is a flow chart illustrating a contents downloading method in accordance with an embodiment of the present invention.

FIG. 6 is a flow chart illustrating a contents downloading method in accordance with the present invention.

With reference to FIG. 6, using the personal computer 200, the user connects to the server device 100 that provides contents. Then the user inputs the environment to download including the device identifier, a field of the content the user desires to download, etc. (S600). At this time, the personal computer 200 should be connected to the DCDP media device 300, where the DCDP media device 300 transmits the device identifier that is stored in the engine memory 330 to the personal computer 200. Therefore, the user does not input the device identifier, but the DCDP media device 300 transmits the device identifier to the server device 100 via the personal computer 200. The control unit 210 in the personal computer 200 then transmits the environment to download, which the user inputted to the server device 100 through the communication unit 400.

The operation of inputting the environment to download takes place when the user first connects to the server device 100 providing contents on the corresponding DCDP media device 300. Meanwhile, the user can change the environment to download after the user connected to the server device 100. The environment to download is stored in the storage unit 150 of the server device 100. Besides the environment described above, the storage unit 150 stores the necessary information to download contents on the DCDP media device 300, such as, information on the registration status of the device identifier and the possible download frequency of the device identifier, etc.

After operation (S600) completing the registration of the device identifier, when the contents from the server device 100 is downloaded, and the DCDP media device 300 is connected to the connection unit 240, the device identifier stored in the DCDP media device 300 is transmitted to the user personal computer 200 through the connection unit 240 (S610). At this time, the detection unit 250 ensures that the DCDP media device 300 is properly connected, and the control unit 210 reads out the device identifier saved in the DCDP media device 300. The operation S610, as described above, is not carried out for the first registration of the DCDP media device 300.

However, to transmit the device identifier at a time of connecting the DCDP media device 300 to the personal computer 200 is possible. In such a case, the host 350 equipped in the DCDP media device 300 outputs the command (DICMD_DEVICE_INFO) to the engine unit 310 for transmission of the device identifier. Upon the receipt of the transmission command of the device identifier from the host 350, the engine unit 310 reads out the device identifier that is stored in the engine memory 330 and transmits the device identifier to the host 350. Table 1 is an example of data structures in the engine memory. In Table 1, EngineNum is a device identifier.

| Byte Offset | Field Name | Data format | Value | Descriptions |
|---|---|---|---|---|
| 0 | Device Type | U8 | 0 x 01 | Device form |
| 1 | Reserved 1 | U8 | 0 x 00 | Pad |
| 2 | Reserved 2 | U8 | 0 x 00 | Pad |
| 3 | Reserved 3 | U8 | 0 x 00 | Pad |
| 4–23 | Device ID | String <20> | | Indicate engine ID as ASCII |

-continued

| Byte Offset | Field Name | Data format | Value | Descriptions |
|---|---|---|---|---|
| 24–31 | Firmware | String <8> | | String. Firmware version |
| 32–33 | Packet Size | U16 | | Current packet size |
| 34–35 | MaxPacketSize | U16 | | Maximum packet size |
| 36–37 | CommandRev | U16 | | Command set version number |
| 38–39 | SpinUpCurrent | String <2> | | Current Skip Up Current Limit |
| 40–43 | HostReadRate | U32 | | Reading speed of Host |
| 44–47 | HostWriteRate | U32 | | Writing speed of Host |
| 48–51 | TimeStamp | U32 | | Present time on the standard of Jan. 1, 1970. |
| 52–53 | SkipSec | U16 | | |
| 54–73 | EngineNum | String <20> | | Unique number of an Engine |
| 74–79 | ContentKeyVersion | String <6> | | |

If the connection unit 240 is the bluetooth chip, the detection unit 250 allows the personal computer 200 to make the address inquiry operation and the call operation, or has the media device 300 respond to the address inquiry operation and the call operation and the detection unit 250 can be installed in the connection unit 240.

The control unit 210 transmits the device identifier that has been transmitted through the connection unit 240 to the server device 100 through the communication unit 220 (S620). The personal computer 200 may contain at least one device identifier and an IP address of the server device corresponding to each device identifier. In such a case, the control unit 210, upon receiving the device identifier through the connection unit 240, transmits the device identifier to the server device with the IP address corresponding to the device identifier and the web browser driving unit 230 drives the web browser according to the device identifier.

The operation unit 110 of the server device 100 confirms whether the possible download frequency for the identical contents of the device identifier transmitted is set up (S630). If the possible download frequency is set up, the operation unit 110 inquires from the counting unit 130 whether the download frequency for the identical contents is less than the designated possible download frequency (S640).

When the possible download frequency is not set up, or the download frequency for the identical content is less than the designated possible download frequency, the server device 100 transmits the contents corresponding to the device identifier transmitted to the personal computer 200 in accordance with the environment to download (S650). However, if the download frequency for the content is equal to or greater than the possible download frequency, the server device 100 does not permit any download for the subject contents (S690).

The control unit 210 of the personal computer 200 outputs a control signal to store the contents transmitted into the storage unit 270 (S660). At this time, the user can decide whether or not to save the downloaded content into the DCDP media device 300 (S650). Meanwhile, the control unit 210 can choose to save the contents into the storage unit 270 in accordance with the designated status of the environment to download, or to transmit the contents directly to the DCDP media device 300 without saving.

In the case that the downloaded contents are designated to be saved in the DCDP media device 300, the control unit 210 transmits the contents, which the user selected, to the DCDP media device 300 through the connection unit 240, and the host of the DCDP media device 300 stores the transmitted contents into the DCD 500 that is inserted in the engine unit 310, where the engine unit 310 records the transmitted contents in the DCD 500 (S680).

Thus far, only the media device 300 using the DCDP has been explained. However, the media device can be any type of media device with a unique device identifier, such as an MP3 player, or an Ebook.

According to the contents downloading system and the method thereof in the present invention, the user can download any contents the user desires by the environment to download the contents the user previously designated, without completing unnecessary procedures, for example, operating the web browser, web surfing, or selecting the contents the user desires to download, by connecting simultaneously to a detachable media device and to a web site based on the device identifier transmitted from the media device.

Further, since a media device like the DCDP, the MP3 player or the Ebook has a respective file format necessary for the device in general, the user can be automatically connected to the web site that provides the contents required for each media device according to the device identifier of the media device as the user connects to the media device, which greatly helps the user to download more conveniently. Furthermore, designating the same possible download frequency for the media devices with the identical device identifier, the media device having a single device identifier can download the identical contents within the range of the designated frequency.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A contents downloading system, comprising:
    a server device providing contents;
    a media device reproducing/recording the contents and transmitting/receiving data with an external device; and
    a user terminal device, connected to the media device, transmitting a device identifier received from the media device to the server device, downloading the contents corresponding to the device identifier of the media device from the server device, and transmitting the contents to the media device, wherein the server device comprises:
    a database unit storing the contents;
    an authentication unit performing an authentication operation on the device identifier transmitted;
    a storage unit storing a registration status for the device identifier, a possible download frequency for the device identifier, and/or an environment to download for the device identifier,
    wherein the environment is inputted by a user in the media device;
    an operation unit searching the contents corresponding to the device identifier from the database unit, and transmitting the contents to the user terminal device if the device identifier transmitted from the authentication unit is authenticated; and
    a counting unit managing the possible download frequency for the device identifier from the media device such that when the user downloads identical contents designated to the device identifier, the operation unit determines whether a download frequency corresponding to the identical contents designated to the device identifier is greater than or equal to a possible download frequency of the identical contents designated to the device identifier, and if the download frequency corresponding to the identical contents designated to the device identifier is greater than or equal to the possible download frequency of the identical contents designated to the device identifier then the operation unit does not download the identical contents.

2. The system according to claim 1, wherein the operation unit deducts from the possible download frequency for the device identifier, a frequency of downloads of the identical contents designated to the device identifier, as a remaining possible download frequency, and if the user attempts to download an identical contents corresponding to the device identifier when the remaining possible download frequency of the identical contents designated to the device identifier is equal to a predetermined value, the operation unit refuses downloading.

3. The system according to claim 1, wherein the environment to download the contents includes the device identifier of the media device and/or a category of the contents to be provided.

4. The system according to claim 1, wherein the user terminal device comprises:
    a communication unit transmitting/receiving data with the server device;
    a connection unit, connected to the media device, receiving the device identifier from the media device; and
    a control unit transmitting the device identifier received from the connection unit to the server device through the communication unit.

5. The system according to claim 4, wherein the connection unit transmits/receives data via wireless communication between the user terminal device and the media device.

6. The system according to claim 4, further comprising:
    a detection unit detecting a connection status of the media device, wherein the control unit requests the media device for transmission of the device identifier, when the detection unit detects that the media device is connected to the connection unit.

7. The system according to claim 6, wherein the connection unit is a Bluetooth chip and the detection unit is provided on the bluetooth chip such that the detection unit allows the user terminal device to make address inquiries and call actions to set up a wireless communication environment.

8. The system according to claim 4, further comprising:
    a user interlace unit for the user to input an environment to download, wherein the control unit transmits the environment to download inputted by the user to the server device through the communication unit.

9. The system according to claim 8, wherein the control unit transmits contents, selected by the user from the contents downloaded based on the device identifier and the environment, through the connection unit.

10. The system according to claim 9, wherein the environment to download the contents includes the device identifier of the media device and/or a category of the contents to be provided.

11. The system according to claim 9, wherein the media device comprises:

an engine unit performing a recording operation of data to a disk and a readout operation of the data from the disk, and transmitting the device identifier stored; and a host controlling the engine unit, transmitting the device identifier to the server device through the user terminal device, and receiving the contents.

12. The system according to claim 11, wherein the engine unit comprises:

a Digital Convergence Disk (DOD) deck unit, to which the disk is inserted, recording data to the disk and/or reading out the data from the disk;

a DOD servo driving the DOD deck unit;

a buffer temporarily storing the data to be recorded and reproduced;

an engine memory storing code values of commands that are shared with the disk and/or the host, control data, and the device identifier;

an engine control unit controlling the DOD deck unit when the disk is inserted, and outputting a control command to transmit the device identifier to the user terminal device when the media device is connected to the user terminal device; and an engine interlace transmitting and receiving the command and data with the host.

13. The system according to claim 11, wherein, the host comprises:

a digital signal processing unit, connected to the engine unit, controlling recording/reading out operation of data by accessing the engine unit, controlling the device identifier transmitting operation that performs a reproducing operation of the read out data and transmits the device identifier, and controlling the media device reproducing/recording files according to attributes of the data;

a memory unit storing recording time information and directory data of a file received from the disk;

an interface unit transmitting and receiving the data from the user terminal device; and an audio output unit outputting audio data reproduced from the disk, and outputting messages generated by the digital signal processing unit.

14. The system according to claim 13, wherein the host further comprises a detection unit detecting a remaining charge of a main battery and sending a result to the digital signal processing unit.

15. A contents downloading method, comprising:

receiving a device identifier from a detachable media device;

transmitting the device identifier to a server device that provides contents;

storinq the contents in a database unit:

receiving selected contents based on the device identifier from the server device; performing an authentication operation with an authentication unit on the device identifier transmitted;

transmitting an environment to download inputted by a user to the server device prior to receiving the device identifier from the detachable media device, wherein the contents to be transmitted is selected in accordance with the environment to download corresponding to the device identifier, and the server device allows a download of the contents within a download frequency limit based on an identical contents desiqnated to the device identifier in receiving the selected contents;

searching an operation unit for the contents corresponding to the device identifier from the database unit, and transmitting the contents to the detachable media device if the device identifier transmitted from the authentication unit is authenticated; and managing a possible download frequency of the contents corresponding to the device identifier from the detachable media device such that when the user downloads identical contents designated to the device identifier is qreater than or equal to a possible download frequency of the identical contents designated to the device identifier, and if the download frequency corresponding to the identical contents designated to the device identifier is greater than or equal to the possible download frequency of the identical contents designated to the device identifier then the operation unit does not download the identical contents.

16. The method according to claim 15, further comprising:

connecting to the server device by driving a web browser corresponding to the device identifier after receiving the device identifier from the detachable media device.

17. The method according to claim 15, wherein the environment to download includes the device identifier and/or a category of the contents to be provided.

18. The method according to claim 15, further comprising:

detecting a connection status of the media device; and requesting transmission of the device identifier from the media device detected, prior to receiving the device identifier from the media device.

19. The method according to claim 15, further comprising:

transmitting the contents selected by a user to the detachable media device.

20. A contents downloading method, comprising:

receiving a device identifier from a media device;

transmitting the device identifier to a server that provides contents;

receiving selected contents based on the device identifier by a user directly accessing the selected contents to download from the server device; and performing an authentication operation with an authentication unit on the transmitted device identifier, wherein the transmitting the device identifier further comprises:

storing the contents in a database unit;

authenticating the transmitted device identifier in the authentication unit;

storing a registration status for the device identifier, a possible download frequency for the device identifier and/or an environment to download the device identifier;

searching an operation unit for the contents corresponding to the device identifier from the database unit, transmitting the contents to the media device if the device identifier transmitted from the authentication unit is authenticated; and determining whether to download an identical contents corresponding to the device identifier from the media device according to whether a download frequency corresponding to the identical contents designated to the device identifier is greater than or equal to the possible download frequency of the identical contents designated to the device identifier, and if the download frequency corresponding to the identical contents designated to the device identifier is greater than or equal to the possible download frequency of the identical contents designated to the device identifier then the operation unit does not download the identical contents.

21. A contents downloading method, comprising:

receiving a device identifier from a media device;

transmitting the device identifier to a server device that provides contents;

storing the contents in a database unit:

performing an authentication operation with an authentication unit on the device identifier transmitted;

simultaneously connecting to the media device and to the server device based on the device identifier transmitted from the media device to receive selected portions of the contents corresponding to an environment to download, wherein the environment is configured by a user;

searching an operation unit for the contents corresponding to the device identifier from the database unit, and transmitting the contents to the media device if the device identifier transmitted from the authentication unit is authenticated; and managing a possible download frequency of the contents corresponding to the device identifier from the media device such that when the user downloads identical contents designated to the device identifier is greater than or equal to a possible download frequency of the identical contents designated to the device identifier, and if the download frequency corresponding to the identical contents designated to the device identifier is greater than or equal to the possible download frequency of the identical contents designated to the device identifier then the operation unit does not download the identical contents.

22. A contents downloading method, comprising:

receiving a device identifier from a media device;

transmitting the device identifier to a server device that provides contents;

storing the contents in a database unit;

performing an authentication operation with an authentication unit on the device identifier transmitted;

automatically and selectively connecting to the media device and to the server device based on the device identifier transmitted from the media device; and receiving the contents in a format of the media device and corresponding to an environment to download based on the device identifier transmitted from the media device, wherein the environment is configured by a user;

searching an operation unit for the contents corresponding to the device identifier from the database unit, and transmitting the contents to the media device if the device identifier transmitted from the authentication unit is authenticated; and managing a possible download frequency of the contents corresponding to the device identifier from the media device such that when the user downloads identical contents designated to the device identifier is greater than or equal to a possible download frequency of the identical contents designated to the device identifier, and if the download frequency corresponding to the identical contents designated to the device identifier is greater than or equal to the possible download frequency of the identical contents designated to the device identifier then the operation unit does not download the identical contents.

* * * * *

UNITED STATES PATENT AND TRADEMARK OFFICE
CERTIFICATE OF CORRECTION

| | |
|---|---|
| PATENT NO. | : 7,222,162 B2 |
| APPLICATION NO. | : 10/193211 |
| DATED | : May 22, 2007 |
| INVENTOR(S) | : Ju-yup Lee et al. |

Page 1 of 1

It is certified that error appears in the above-identified patent and that said Letters Patent is hereby corrected as shown below:

Column 12, Line 53, change "interlace" to --interface--.

Column 13, Line 9, change "(DOD)" to --(DCD)--.

Column 13, Line 12, before "servo" change "DOD" to --DCD--.

Column 13, Line 12, after "the" change "DOD" to --DCD--.

Column 13, Line 18, change "DOD" to --DCD--.

Column 13, Line 23, change "interlace" to --interface--.

Column 13, Line 51, change "storinq" to --storing--.

Column 13, Line 51, change "unit:" to --unit;--.

Column 13, Line 64, change "desiqnated" to --designated--.

Column 14, Line 8, change "qreater" to --greater--.

Column 14, Line 36, after "server" insert --device--.

Column 15, Line 8, change "unit:" to --unit;--.

Signed and Sealed this

Sixteenth Day of October, 2007

JON W. DUDAS
*Director of the United States Patent and Trademark Office*